United States Patent
Sakamaki et al.

(10) Patent No.: US 8,971,677 B2
(45) Date of Patent: Mar. 3, 2015

(54) OPTICAL 90-DEGREE HYBRID CIRCUIT

(75) Inventors: Yohei Sakamaki, Atsugi (JP); Toshikazu Hashimoto, Atsugi (JP); Yusuke Nasu, Atsugi (JP); Kuninori Hattori, Atsugi (JP); Hiroshi Takahashi, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 633 days.

(21) Appl. No.: 13/377,774

(22) PCT Filed: Jun. 30, 2010

(86) PCT No.: PCT/JP2010/004320
§ 371 (c)(1),
(2), (4) Date: Dec. 12, 2011

(87) PCT Pub. No.: WO2011/001679
PCT Pub. Date: Jan. 6, 2011

(65) Prior Publication Data
US 2012/0082414 A1    Apr. 5, 2012

(30) Foreign Application Priority Data

Jun. 30, 2009 (JP) ................................. 2009-155837

(51) Int. Cl.
*G02B 6/26* (2006.01)
*H04B 10/67* (2013.01)
*G02B 6/12* (2006.01)
*H04B 10/61* (2013.01)

(52) U.S. Cl.
CPC .......... *H04B 10/677* (2013.01); *G02B 6/12004* (2013.01); *H04B 10/611* (2013.01); *H04B 10/613* (2013.01); *G02B 6/12007* (2013.01)
USPC ........................................................ 385/31

(58) Field of Classification Search
None
See application file for complete search history.

(56) References Cited

U.S. PATENT DOCUMENTS

| 5,878,181 A | 3/1999 | Van Der Tol |
| 2006/0159384 A1 | 7/2006 | Sugiyama |
| 2009/0009772 A1 | 1/2009 | Tanimura |

FOREIGN PATENT DOCUMENTS

| JP | 06-281897 | 10/1994 |
| JP | 06-289342 | 10/1994 |
| JP | 10-73731 | 3/1998 |

(Continued)

OTHER PUBLICATIONS

English translation of International Preliminary Report on Patentability for International Application No. PCT/JP2010/004320, filed Jun. 30, 2010, mailed Feb. 23, 2012.

(Continued)

*Primary Examiner* — Sarah Hahm
(74) *Attorney, Agent, or Firm* — Workman Nydegger (57) ABSTRACT

An optical 90-degree hybrid circuit includes: first and second optical splitters for receiving and splitting a first and second light beam into two, respectively; a first optical coupler for generating an interfering light beam by multiplexing one of the light beams split by the first optical splitter and the second optical splitter; and a second optical coupler for generating an interfering light beam by multiplexing another one of the light beams split by the first optical splitter and the second optical splitter. The first optical splitter includes an optical coupler configured to output two light beams having equal phases, and the second optical splitter includes an optical coupler configured to output two light beams having a phase difference of 90 degrees.

6 Claims, 6 Drawing Sheets

(56) References Cited

FOREIGN PATENT DOCUMENTS

| | | |
|---|---|---|
| JP | 2006-195256 | 7/2006 |
| JP | 2008-275514 | 11/2008 |
| JP | 2008-304410 | 12/2008 |
| WO | WO 03/063515 | 7/2003 |

OTHER PUBLICATIONS

International Search Report dated Aug. 3, 2010 for International Application No. PCT/JP2010/004320.

Sun Hyok Chang et al., *Impact of Quadrature Imbalance in Optical Coherent QPSK Receiver*, IEEE Photonics Technology Letters, vol. 21, No. 11, Jun. 1, 2009, pp. 709-711.

OPTICAL 90-DEGREE HYBRID CIRCUIT

TECHNICAL FIELD

The present invention relates to an optical 90-degree hybrid circuit forming an optical receiver used in a coherent receiving method in optical transmission systems. More specifically, the present invention relates to an optical 90-degree hybrid circuit which achieves wavelength-independence of a phase difference between in-phase output and quadrature output.

BACKGROUND ART

Attention has been drawn to an optical multilevel modulation method in aiming for constructing a super-high-speed optical transmission system of 100 Gbit/s or higher. In particular, a coherent receiving method such as DP-QPSK (Dual Polarization Quadrature Phase-Shift Keying) has attracted attention because of its advantages of enhanced optical noise immunity and compensation performance by electrical signal processing on wavelength dispersion distortion after photoelectric conversion. Application of the coherent receiving method to a transmission system has been actively discussed. An optical receiver used in the coherent receiving method includes: a local oscillation light generator configured to generate a local oscillation light beam; a polarized beam splitter configured to separate a signal light beam and the local oscillation light beam for output to different output ports according to the polarized wave states; an optical 90-degree hybrid circuit configured to multiplex the signal light beam and the local oscillation light beam; a photoelectric converter configured to convert an output signal from the optical 90-degree hybrid circuit to an electrical signal; an AD converter configured to convert the electrical signal outputted from the photoelectric converter to a digital signal; and a digital signal processing (DSP) circuit configured to perform calculation using the digital signal. The optical receiver separately detects an in-phase component and a quadrature component of an interfering light beam of the inputted signal light beam and local oscillation light beam, and thereby can obtain information included in the inputted signal light beam.

As one of the components of the optical receiver used in the coherent receiving method, an optical 90-degree hybrid including a spatial optical system having combined bulk-type optics has been developed and commercialized. Meanwhile, a planer lightwave circuit (PLC) including optical waveguides formed on a planer substrate is superior in mass-productivity and reliability to the aforementioned spatial system. Moreover, employing the PLC-type optical 90-degree hybrid circuit gives a higher possibility of achieving integration of, for example, the polarized wave beam splitter and the photoelectric converter and enables provision of a more compact optical receiver than employing the spatial optical system. Because of such a background, commercialization of the PLC-type optical 90-degree hybrid circuit is expected.

Figure 1:
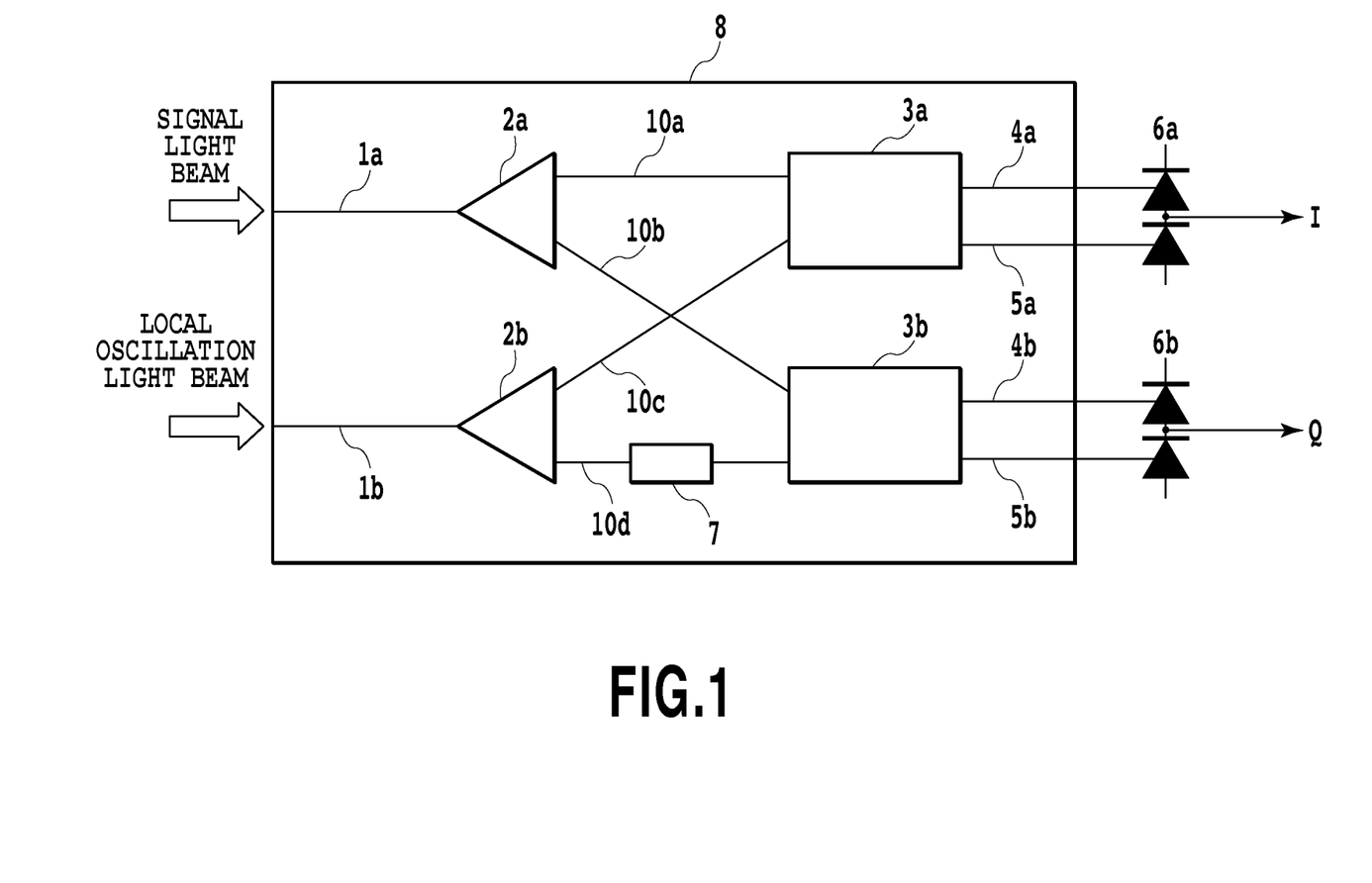
FIG. 1 is a configuration diagram showing an optical 90-degree hybrid circuit based on a conventional technique.

FIG. 1 is a configuration diagram showing a conventional optical 90-degree hybrid circuit. The conventional PLC-type optical 90-degree hybrid circuit is shown in Patent Literature 1. Patent Literature 1 relates to an optical delay interference circuit used for demodulating a DQPSK (Differential Quadrature Phase-Shift Keying) signal. The optical delay interference circuit itself is not a part forming the optical receiver used in the coherent receiving method, but has, in apart of the circuit, a function as the optical 90-degree hybrid circuit configured to multiplex the two light waves and separate the light waves to the in-phase component and the quadrature component. Hereinafter, the in-phase component is expressed as an "I component," and the quadrature component is expressed as a "Q component." FIG. 1 shows a configuration of only a circuit portion required to achieve the optical 90-degree hybrid function, which is extracted from optical circuits described in Patent Literature 1.

Here, a description is given of a propagation process of light beams inputted to the conventional PLC-type optical 90-degree hybrid circuit in FIG. 1. A signal light beam inputted from the outside of the PLC passes through an input waveguide 1*a* and is split into two by an optical splitter 2*a*. A local oscillation light beam inputted from the outside of the PLC passes through an input waveguide 1*b* and is split into two by an optical splitter 2*b*. The two light beams split by the optical splitter 2*a* are inputted to two optical couplers 3*a* and 3*b* through arm waveguides 10*a* and 10*b*, respectively. The two light beams split by the optical splitter 2*b* are inputted to the two optical couplers 3*a* and 3*b* through arm waveguides 10*c* and 10*d*, respectively. The signal light beam and the local oscillation light beam inputted to each of the optical coupler 3*a* and the optical coupler 3*b* are multiplexed to form an interfering light beam. The interfering light beam is split into two interfering light beams having a phase difference of 180 degrees, which are then outputted. The interfering light beams, of the signal light beam and the local oscillation light beam outputted from the optical coupler 3*a* are outputted through output waveguides 4*a* and 5*a* to a differential receiver 6*a* formed as an external circuit and functioning as a photoelectric converter. The interfering light beams, of the signal light beam and the local oscillation light beam outputted from the optical coupler 3*b* are outputted through output waveguides 4*b* and 5*b* to a differential receiver 6*b* formed as an external circuit and functioning as a photoelectric converter.

Any one of the four arm waveguides 10*a*, 10*b*, 10*c*, and 10*d* is provided with a 90-degree phase shifter 7. Thereby, the differential receivers 6*a* and 6*b* perform differential detection on the interfering light beams outputted from the optical coupler 3*a* and the optical coupler 3*b* through the output waveguides 4*a*, 4*b*, 5*a*, and 5*b*, so that the I component and the Q component of inputted modulated signals can be separated. Meanwhile, in order to simultaneously detect the I component and the Q component of the modulated signals, the two arm waveguides 10*a* and 10*b* configured to transmit the signal light beams split by the optical splitter 2*a*, and the two arm waveguides 10*c* and 10*d* configured to transmit the local oscillation light split by the optical splitter 2*b* need to have an equal waveguide length except for the shifter 7. Further, when the four arm waveguides 10*a*, 10*b*, 10*c*, and 10 are formed to have the equal wavelength except for the shifter 7, the circuit can be utilized as an optical 90-degree hybrid circuit included in the optical delay interference circuit for receiving differential phase modulated signals of DQPSK or the like.

CITATION LIST

Patent Literature

PTL 1: International Patent Publication No. WO 2003/063515

Non Patent Literature

NPL 1: S. H. Chang, H. S. Chung and K. Kim, "Impact of quadrature imbalance in optical coherent QPSK receiver", IEEE Photonics Technology Letters, vol. 21, no. 11, pp. 709-711, Jun. 1, 2009.

SUMMARY OF INVENTION

Technical Problem

However, a configuration of the 90-degree phase shifter 7 causes a problem to be described below. The 90-degree phase shifter 7 is installed for the purpose of changing an optical path length by $\lambda \times (\pm 1/4 + m)$. Note that $\lambda$ denotes a wavelength of a signal light beam or a local oscillation light beam, and m is an integer. As shown in Non Patent Literature 1, when a phase shift $\theta$ of the propagated light beam in the 90-degree phase shifter 7 deviates from 90 degrees, a demodulation performance degrades. For example, to limit an OSNR (optical signal-noise-ratio) penalty to 0.5 dB or lower in BER (Bit Error Rate)=$10^{-3}$, such phase error needs to be limited to within a 5 degree.

For configuring the 90-degree phase shifter 7, there is a method in which a thin film heater is loaded on an upper surface of the PLC, power is applied to the heater to heat a vicinity of a core forming waveguides, and thereby an effective refractive index of the core is adjusted. Where an amount of refractive index change due to the heating of the core is $\Delta N$, and the length of the heater is L, the following equation holds true.

$$L \times \Delta N = (\pm 1/4 + m)\lambda \quad (1)$$

In this configuration, the phase shift $\theta$ can accurately be adjusted to 90 degrees by adjusting the applied power. Meanwhile, there arises the following problem. When the 90-degree hybrid have the phase error, constant power needs to be always applied, and this leads to an increase of power consumption in the optical receiver. Moreover, a function of monitoring the phase shift $\theta$ needs to be added in consideration of an influence by aging of the heater and a wiring portion. Thus, there is a concern over increase in complexity of the optical receiver and a control mechanism thereof.

For configuring the 90-degree phase shifter 7 in a different manner from that described above, there is a method in which the length of a waveguide is adjusted. In this case, the length of only one of the four arm waveguides 10a, 10b, 10c, and 10d on which the 90-degree phase shifter 7 is installed may be changed by $\Delta L$ to satisfy the following equation:

$$\Delta L \times N(\lambda) = (\pm 1/4 + m)\lambda \quad (2).$$

Here, N denotes an effective refractive index of the core forming the waveguides, and is expressed by a function of the wavelength $\lambda$. This configuration has advantages of consuming no power, and not needing the function of monitoring the phase shift $\theta$. However, since $\Delta L$ can be set to only a certain unique value, the phase shift $\theta$ depends on the wavelength $\lambda$ of the propagated light beam. For example, when $\Delta L$ of the 90-degree phase shifter 7 is designed ($\theta$=90 degrees) so that a certain wavelength $\lambda_1$ can satisfy Equation (2), a phase shift $\theta_2$ in a different wavelength $\lambda_2$ is expressed by the following equation.

Formula 1

$$\theta_2 = \frac{N(\lambda_2) \cdot \lambda_1}{N(\lambda_1) \cdot \lambda_2} \theta_1 \quad (3)$$

As an operational wavelength range of 90-degree hybrid circuit is extended, the deviation of the phase shift $\theta$ from 90 degrees is increased, and the influence on the deterioration of the reception characteristics becomes larger.

The present invention has been made in view of such problems, and an object thereof is to provide an optical 90-degree hybrid circuit which achieves wavelength-independence. More specifically, an object of the present invention is to provide an optical 90-degree hybrid circuit which achieves the wavelength-independence of a phase difference between in-phase output and quadrature output (hereinafter, expressed as an "IQ phase difference").

Solution to Problem

In the present invention, to achieve the above object, an invention described in claim 1 is an optical 90-degree hybrid circuit characterized by including: first optical splitting means for receiving and splitting a first light beam into two; second optical splitting means for receiving and splitting a second light beam into two; first optical coupling means for generating an interfering light beam by multiplexing one of the light beams split by the first optical splitting means and one of the light beams split by the second optical splitting means; and second optical coupling means for generating an interfering light beam by multiplexing the other one of the light beams split by the first optical splitting means and the other one of the light beams split by the second optical splitting means, the optical 90-degree hybrid circuit characterized in that the first optical splitting means includes an optical coupler configured to receive the first light beam and to output two light beams having equal phases, and the second optical splitting means includes an optical coupler configured to receive the second light beam and to output two light beams having a phase difference of 90 degrees.

An invention described in claim 2 is the optical 90-degree hybrid circuit according to claim 1, characterized by including: a first arm waveguide connecting the first optical splitting means and the first optical coupling means; a second arm waveguide connecting the first optical splitting means and the second optical coupling means; a third arm waveguide connecting the second optical splitting means and the first optical coupling means; and a fourth arm waveguide connecting the second optical splitting means and the second optical coupling means, the optical 90-degree hybrid circuit characterized in that the first arm waveguide, the second arm waveguide, the third arm waveguide, and the fourth arm waveguide each have a straight portion, a first curved portion and a second curved portion, the straight portions of the first arm waveguide, the second arm waveguide, the third arm waveguide, and the fourth arm waveguide are equal in length, the first curved portions of the first arm waveguide, the second arm waveguide, the third arm waveguide, and the fourth arm waveguide are equal in radius and length, and the second curved portions of the first arm waveguide, the second arm waveguide, the third arm waveguide, and the fourth arm waveguide are equal in length and radius.

An invention described in claim 3 is the optical 90-degree hybrid circuit according to claim 1, characterized in that the second optical splitting means includes a directional coupler.

An invention described in claim 4 is the optical 90-degree hybrid circuit according to claim 1, characterized in that the second optical splitting means includes an MMI coupler.

Advantageous Effects of Invention

The present invention enables the optical 90-degree hybrid circuit to achieve the wavelength-independence of IQ phase difference. As an optical splitter connected with one of input waveguides of the optical 90-degree hybrid circuit and configured to split an inputted light beam into two beams, the optical 90-degree hybrid circuit utilizes an optical coupler configured to make the two split light beams have a phase difference of 90 degrees independently of wavelengths thereof. Thereby, a circuit configuration suitable to achieve the wavelength-independence of IQ phase difference can be provided. Thus, deterioration of the reception characteristic can be prevented.

DESCRIPTION OF EMBODIMENTS

The present invention provides an optical 90-degree hybrid circuit achieving wavelength-independence of IQ phase difference.

Figure 2:
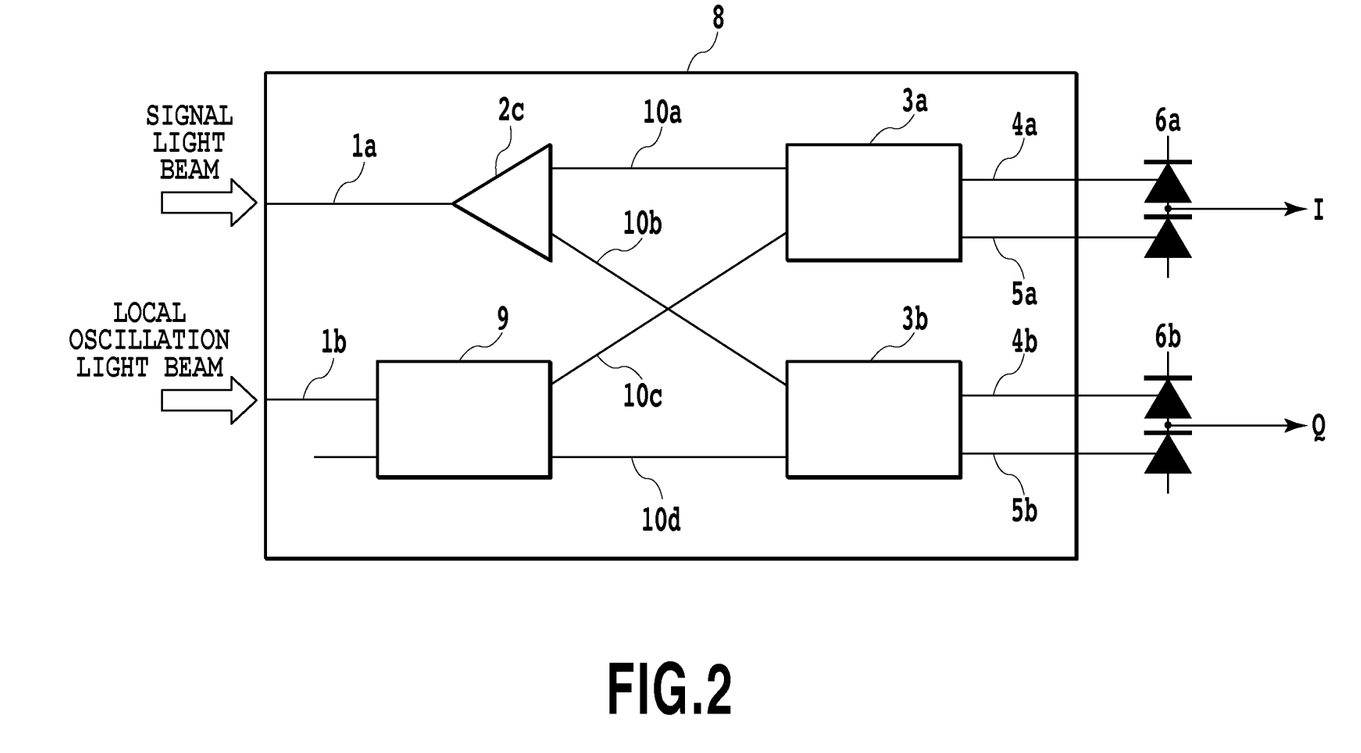
FIG. 2 is a configuration diagram showing an optical 90-degree hybrid circuit according to an embodiment of the present invention.

FIG. 2 is a diagram showing a configuration of the optical 90-degree hybrid circuit according to the present invention which achieves the wavelength-independence of IQ phase difference. The optical 90-degree hybrid circuit according to the present invention includes: a first optical splitter 2c connected with an input waveguide 1a; a second optical splitter 9 connected with an input waveguide 1b; arm waveguides 10a and 10b connected with the first optical splitter 2c; arm waveguides 10c and 10d connected with the second optical splitter 9; an optical coupler 3a connected with the arm waveguides 10a and 10c; an optical coupler 3b connected with the arm waveguides 10b and 10d; output waveguides 4a and 5a connected with the optical coupler 3a; and output waveguides 4b and 5b connected with the optical coupler 3b.

Here, a description is given of the components. A signal light beam inputted from the outside of the PLC passes through the input waveguide 1a and is split into two by the first optical splitter 2c. A local oscillation light beam inputted from the outside of the PLC passes through the input waveguide 1b and is split into two by the second optical splitter 9. One of the two light beams split by the first optical splitter 2c is inputted to the optical coupler 3a through the arm waveguide 10a, and the other is inputted to the optical coupler 3b through the arm waveguide 10b. One of the two light beams split by the second optical splitter 9 is inputted to the optical coupler 3a through the arm waveguide 10c, and the other is inputted to the optical coupler 3b through the arm waveguide 10d. The two light beams inputted to the optical coupler 3a are multiplexed to form interfering light beams. The two light beams inputted to the optical coupler 3b are multiplexed to form interfering light beams. The interfering light beams outputted from the optical coupler 3a are outputted to a differential receiver 6a through the output waveguides 4a and 5a. The interfering light beams outputted from the optical coupler 3b are outputted to a differential receiver 6b through the output waveguides 4b and 5b.

The first optical splitter can be an optical splitter formed by a Y-branch waveguide, for example. The second optical splitter can be a directional coupler or an MMI coupler, for example.

The differential receivers 6a and 6b are formed as external circuits, function as photoelectric converters, and perform differential detection on the interfering light beams outputted from the optical coupler 3a and the optical coupler 3b to separate an I component and a Q component from each other in inputted modulated signals.

The second optical splitter 9 splits the local oscillation light beam into two and shifts the phases of the light beams so that a phase difference between the light beams split into two can be 90 degrees independently of wavelengths thereof. Provided with the second optical splitter 9, the optical 90-degree hybrid circuit can split a light beam into two light beams having a phase difference of 90 degrees independently of wavelengths without being equipped with the 90-degree phase shifter 7, unlike the conventional technique shown in FIG. 1. In this way, the optical 90-degree hybrid circuit achieves the wavelength-independence of IQ phase difference.

Hereinafter, a description is given of the details of an operation principle of the optical 90-degree hybrid circuit according to the present invention. Any one of a directional coupler and an MMI (Multi-Mode Interference) coupler each of which includes two or more input waveguides and two or more output waveguides is utilized as the second optical splitter 9. The description is herein given by taking as an example a directional coupler including two input waveguides and two output waveguides. When the two optical waveguides forming the directional coupler have the same configuration, and the length of the directional coupler is set at a half of the combined length of the optical waveguides, a transmission matrix of the directional coupler is expressed by the following equation.

Formula 2

$$\begin{bmatrix} A_2 \\ B_2 \end{bmatrix} = \frac{1}{\sqrt{2}} \begin{bmatrix} 1 & -j \\ -j & 1 \end{bmatrix} \begin{bmatrix} A_1 \\ B_1 \end{bmatrix} \quad (4)$$

Note that $A_1$ and $B_1$ respectively denote electric fields of light beams entering the two input waveguides, and $A_2$ and $B_2$ respectively denote electric fields of light beams emitted from the two outputs. From Equation (4), the following are found: in the case of $(A_1, B_1) = (1, 0)$, $$(A_2, B_2) = \frac{1}{\sqrt{2}}(1, j); \qquad \text{Formula 3}$$

and in the case of $(A_1, B_1) = (0, 1)$, $$(A_1, B_1) = \frac{1}{\sqrt{2}}(-j, 1). \qquad \text{Formula 4}$$

This means that when a light beam is inputted to one of the input waveguides, light beams having the same intensity are outputted from the two output waveguides. As described above, when a light beam is inputted to one of the two input waveguides, the directional coupler exerts the same function as that of the optical splitter 2b shown in the conventional technique (FIG. 1), as the first optical splitter configured to split the inputted light beam into two. Further, focusing on a phase relationship between the light beams outputted from the two output waveguides, it is found that the phases thereof is shifted by 90 degrees from each other. When the description is given with reference to the configuration in FIG. 2, this corresponds to a fact that, with respect to light beams outputted from the second optical splitter 9 through the arm waveguides 10c and 10d, the phase of the light beam transmitted through the arm waveguide 10d is shifted by 90 degrees from the phase of the light beam transmitted through the arm waveguide 10c. This exerts the same function as that of the 90-degree phase shifter 7 shown in the conventional technique (FIG. 1).

As described above, the optical splitter 2b shown in the conventional technique in FIG. 1 is replaced with, for example, the directional coupler or the like, and thereby the functions of the optical splitter 2b and the 90-degree phase shifter 7 can be implemented simultaneously. Note that the description has herein been given by taking the directional coupler as an example, but the second optical splitter 9 included in the present invention is not limited to the directional coupler. It is also possible to use an MMI coupler or the like connected with two input waveguides and two arm waveguides and configured to split light beams.

The same effects can be obtained as those in the aforementioned example of the directional coupler, when a second optical splitter including one or more input ports and two or more output ports has the following configuration. Specifically, one of the one or more input ports is connected with the input waveguide 2b. In addition, from the two or more output ports, a pair of two output ports having a 90-degree phase difference between outputted light beams is selected to output the light beams to the optical coupler through the arm waveguides 10c and 10d. Similarly, it is also possible to use an MMI coupler or the like connected to more than two input waveguides and arm waveguides.

In addition, FIG. 2 shows an input waveguide not receiving a light beam out of the two input waveguides of the second optical splitter 9. The waveguide not receiving a light beam, however, may be eliminated. This also holds true for the second optical splitter 9 connected with the more than two input waveguides and arm waveguides. Even if the waveguide through which an inputted/outputted light beam does not pass is eliminated, the effects of the present invention are not impaired.

The input waveguide of the local oscillation light beam is connected with the second optical splitter 9 in the description above. However, it is clear that, even if input positions of the signal light beam and the local oscillation light beam are replaced with each other in FIG. 2, the function, of the optical 90-degree hybrid circuit, of separating the I component and the Q component which are orthogonal to each other are exerted, and the effects of the present invention are not impaired.

Next, a description is given quantitatively of the wavelength-independence of IQ phase difference achieved by the configuration of the optical 90-degree hybrid circuit according to the present invention. Dependence on wavelengths of a deviation of the phase shift θ from 90 degrees in the 90-degree phase shifter 7 in the conventional technique is expressed by a linear function of a wavelength and denoted by β×Δλ. Here, β is a constant of a unit [degree/nm], and the phase shift θ is expressed by θ=90+βΔλ. A difference between a reference wavelength $\lambda_0$ and a wavelength of a propagated light beam which is designed for θ=90 degrees is denoted by Δλ. Table 1 shows a relative phase relationship of the light beams outputted from the output waveguides 4a, 5a, and 5b, in a case of a phase of a light beam outputted from the output waveguide 4a is used as a reference.

TABLE 1

|  | 4a | 5a | 4b | 5b |
|---|---|---|---|---|
| Conventional technique | 0 | 180 | −90 − βΔλ | 90 − βΔλ |
| Present invention | 0 | 180 | −90 | 90 |

The lengths of the four arm waveguides 10a, 10, 10c, and 10d are herein assumed to be equal to each other. As the IQ phase difference of the optical 90-degree hybrid circuit, phase differences between the output waveguides 4a and 4b, between the output waveguides 4b and 5a, and between the output waveguides 5b and 4b need to be evaluated. Table 2 shows the phase differences of the light beams outputted from the output waveguides 4a and 4b, the output waveguides 4b and 5a, and the output waveguides 5b and 4b. Here, −270 degrees and 90 degrees are equivalent to each other as absolute values of the phase differences of the light beams, and thus the conversion is made so that the phase differences in the table can be positive numbers.

TABLE 2

|  | 4a-4b | 4b-5a | 5a-5b | 5b-4a |
|---|---|---|---|---|
| Conventional technique | 90 + βΔλ | 90 − βΔλ | 90 + βΔλ | 90 − βΔλ |
| Present invention | 90 | 90 | 90 | 90 |

According to the configuration of the present invention, the IQ phase difference is 90 degrees independently of the wavelengths, while the IQ phase difference deviates from 90 degrees by ±β×Δλ in the conventional technique. That is, it is found that the deviation of the IQ phase difference from 90 degrees is always zero independently of the wavelengths. This is an effect that a relative phase difference between two outputs outputted from the second optical splitter 9 is 90 degrees independently of the wavelengths in the configuration of the present invention, while the dependence of the phase shift θ on the wavelengths in the 90-degree phase shifter 7 is inevitable in the conventional technique.

Example 1

Figure 3:
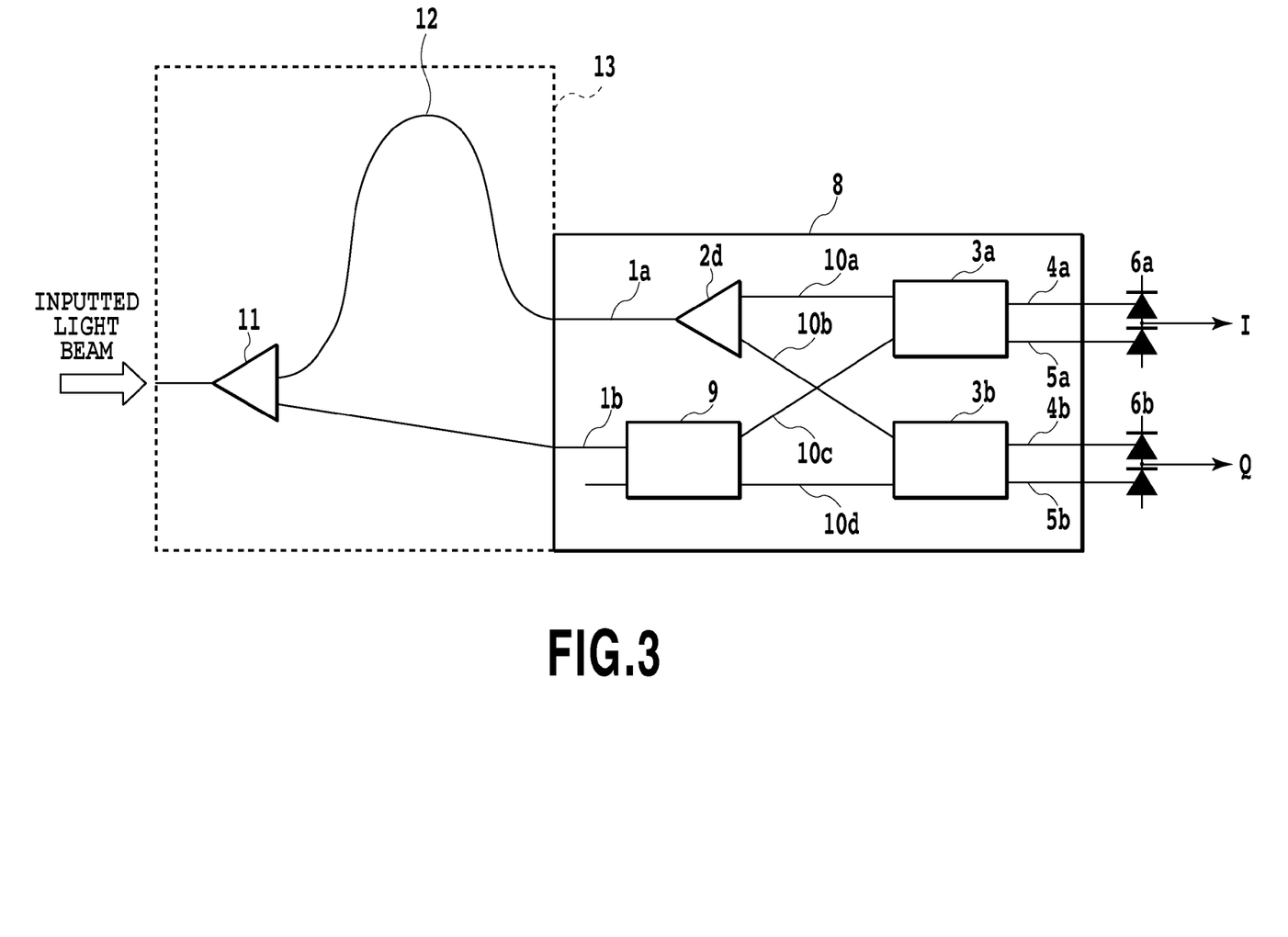
FIG. 3 is a schematic diagram showing an optical 90-degree hybrid circuit according to Example 1 of the present invention.

FIG. 3 shows a schematic diagram of an actually manufactured optical 90-degree hybrid circuit according to Example 1. In Example 1, an optical splitter 2d including a Y-branch waveguide is utilized as first optical splitting means, and a directional coupler is utilized as the second optical splitter 9. A PLC technique is used for manufacturing the optical 90-degree hybrid circuit. Specifically, silica based glass waveguides are formed on a silicon substrate by using a flame hydrolysis deposition method and reactive ion etching. The core has a cross-sectional shape of a 4.5 μm square, and the relative refractive index difference is 1.5%. The core is buried in overcladding glass having a thickness of 30 μm. An optical delay circuit portion 13 including an optical splitter 11 and a delay line 12 is connected to the input waveguides 1a and 1b of the optical 90-degree hybrid of the present invention for the purpose of evaluating the IQ phase difference in experiments.

The purpose thereof is to form an optical delay interference circuit in the following manner. Specifically, instead of the signal light beam and the local oscillation light beam in FIG. 2, light beams outputted from the same light source are split, one of the split light beams through the delay line is delayed, and then the light beams are inputted to the input waveguides 1a and 1b of the optical 90-degree hybrid circuit. The optical delay interference circuit makes it possible to calculate a relative phase difference between the light beams outputted from the output waveguides 4a, 4b, 5a, and 5b, on the basis of transmission spectrums outputted from the output waveguides 4a, 4b, 5a, and 5b. It is clear that if the optical delay circuit portion 13 is removed after the evaluation of the IQ phase difference, the optical 90-degree hybrid circuit functions, and the effects are not impaired.

Figure 4A:
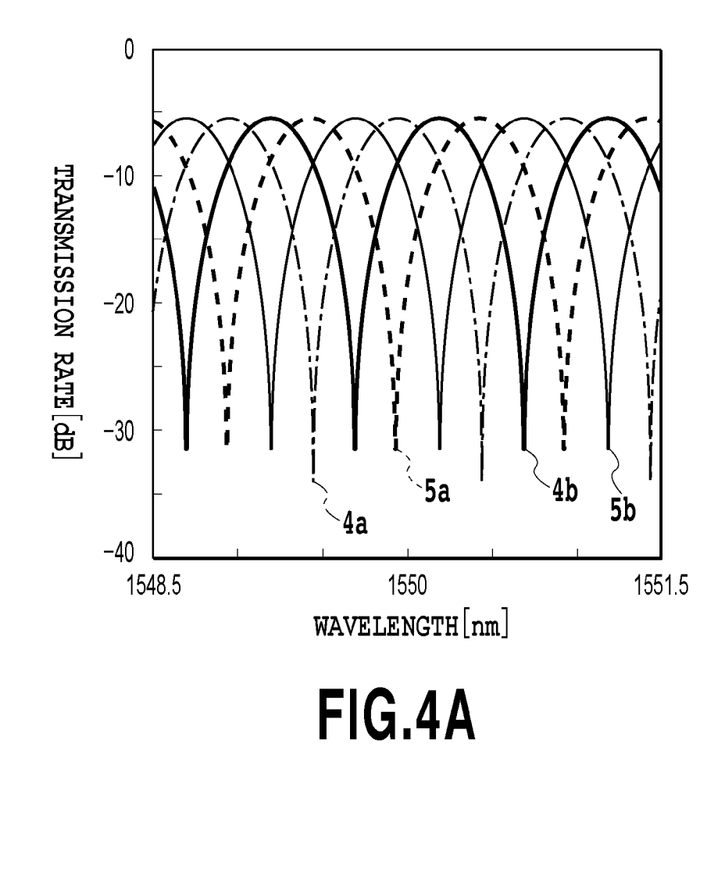
FIG. 4A is a graph showing measurement results of transmission spectrums of an optical 90-degree hybrid circuit according to Example 1 of the present invention.
Figure 4B:
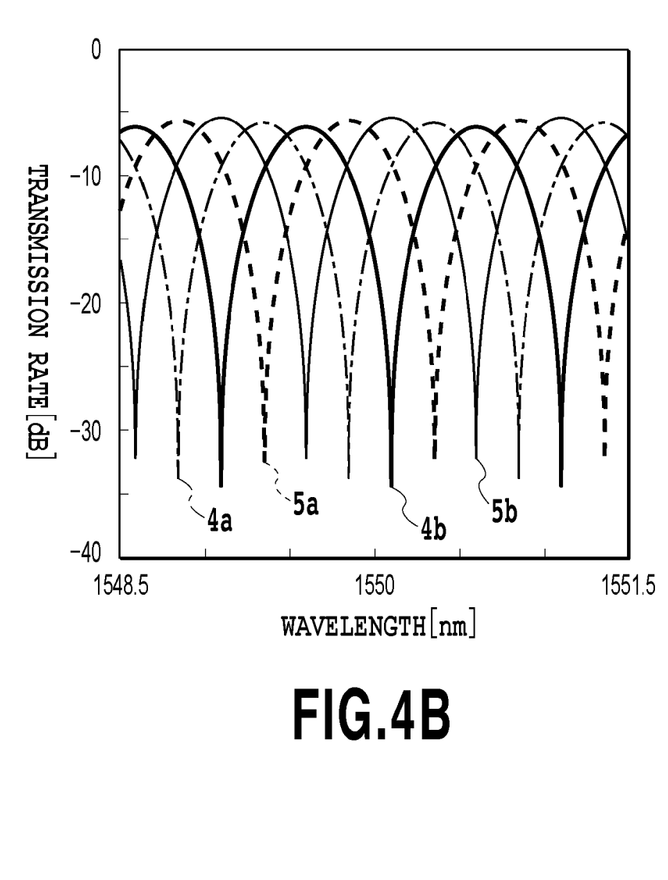
FIG. 4B is a graph showing measurement results of transmission spectrums of the optical 90-degree hybrid circuit according to the conventional technique of the present invention.
Figure 5:
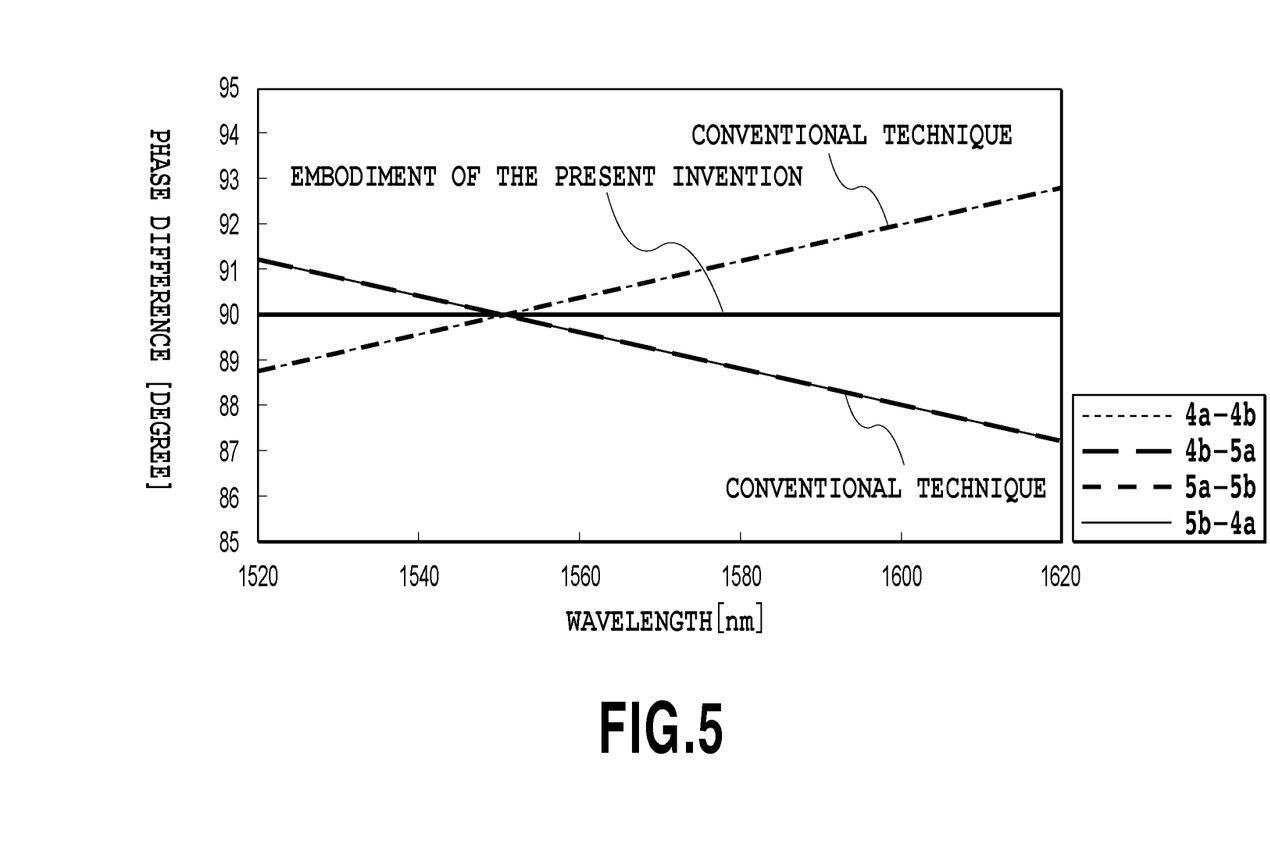
FIG. 5 is a graph showing evaluation results of IQ phase differences in the optical 90-degree hybrid circuits according to Example 1 of the present invention and the conventional technique.

FIG. 4A and FIG. 4B show measurement results of the transmission spectrums of the manufactured optical 90-degree hybrid circuit. FIG. 4A is a graph showing the measurement results of the transmission spectrums of the optical 90-degree hybrid circuit according to Example 1 of the present invention. FIG. 4B is a graph showing the measurement results of the transmission spectrums of the optical 90-degree hybrid circuit according to the conventional technique. For comparison with the conventional technique, an optical 90-degree hybrid circuit based on the conventional technique is manufactured in the same manufacturing process as that in the example of the present invention, and the phase differences between the outputs are evaluated. FIG. 4A and FIG. 4B show the results as well. FIG. 5 is a graph in which the phase differences between the outputs calculated from the measurement results of the transmission spectrums shown in FIG. 4A and 4B are plotted as functions of the inputted light wave lengths. In the configuration based on the conventional technique, a coefficient β of the wavelength dependence of a deviation of a phase shift θ from 90 degrees in the 90-degree phase shifter 7 is shown by β=0.04 [degree/nm]. In contrast, the IQ phase difference of the optical 90-degree hybrid circuit of this example is zero independently of the wavelengths. It has been confirmed also in the experiments that the wavelength dependence of the IQ phase difference deviation from 90 degrees has been solved.

Example 2

It is publicly known that even if wavelengths have core layers having the same composition, a curved waveguide exhibits equivalent index distribution which is different from that of a straight waveguide and depends on a radius of the curve. Suppose that the arm waveguides 10a to 10d each have a straight portion and a curved portion. If the ratio of the straight waveguide length to the curved waveguide length in the arm waveguides 10a to 10d is different among the arm waveguides 10a to 10d, the difference causes a slight difference in optical path length and becomes a factor of an occurrence of a deviation of the IQ phase difference from 90 degrees. Example 2 is provided in view of such a problem.

Figure 6:
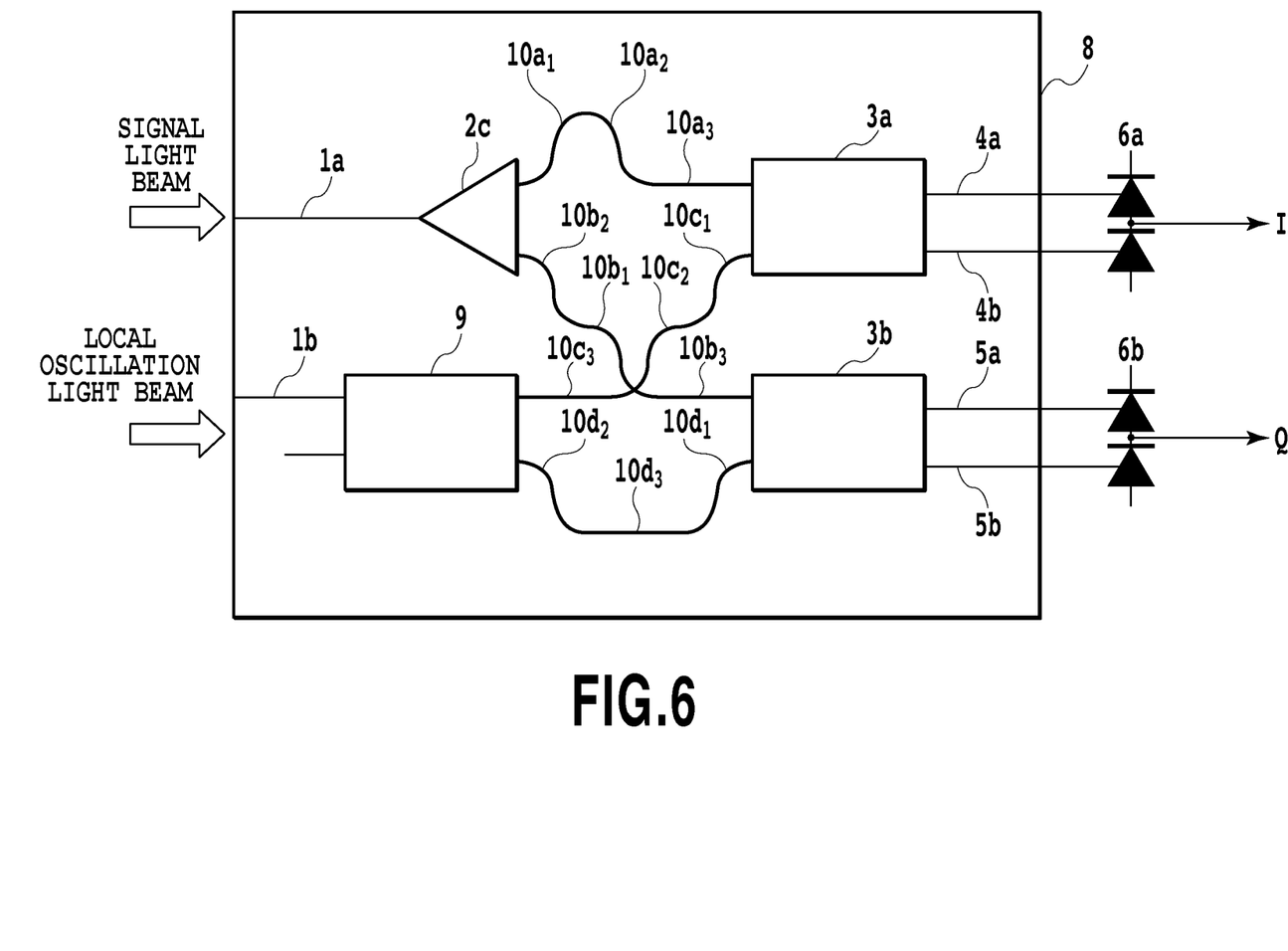
FIG. 6 is a configuration diagram showing an optical 90-degree hybrid circuit according to Example 2 of the present invention.

FIG. 6 is a diagram showing a configuration of an optical 90-degree hybrid circuit according to Example 2 of the present invention. The optical 90-degree hybrid circuit according to this Example 2 includes: a first optical splitter 2c connected with an input waveguide 1a; a second optical splitter 9 connected with the input waveguide 1b; arm waveguides 10a and 10b connected with the first optical splitter 2c; arm waveguides 10c and 10d connected with the second optical splitter 9; an optical coupler 3a connected with the arm waveguides 10a and 10c; an optical coupler 3b connected with the arm waveguides 10b and 10d; output waveguides 4a and 5a connected with the optical coupler 3a; and output waveguides 4b and 5b connected with the optical coupler 3b.

In Example 2, the arm waveguides 10a to 10d each have the straight portion and the curved portion. More specifically, the arm waveguide 10a includes curved portions $10a_1$ and $10a_2$ and a straight portion $10a_3$; the arm waveguide 10b includes curved portions $10b_1$ and $10b_2$ and a straight portion $10b_3$; the arm waveguide 10c includes curved portions $10c_1$ and $10c_2$ and a straight portion $10c_3$; and the arm waveguide 10d includes curved portions $10d_1$ and $10d_2$ and a straight portion $10d_3$.

In the arm waveguide 10a, the curved portion $10a_1$ has a total $R_{a1}l$ of lengths of curves having a radius $R_{a1}$, the curved portion $10a_2$ has a total $R_{a2}l$ of lengths of curves having a radius $R_{a2}$, and the straight portion $10a_3$ has a total $S_a l$ of lengths of the straight portion $10_{a3}$.

In the arm waveguide 10b, the curved portion $10b_1$ has a total $R_{b1}l$ of lengths of curves having a radius $R_{b1}$, the curved portion $10a_2$ has a total $R_{b2}l$ of lengths of curves having a radius $R_{b2}$, and the straight portion $10b_3$ has a total $S_b l$ of lengths of the straight portion $10_{b3}$.

In the arm waveguide 10c, the curved portion $10c_1$ has a total $R_{c1}l$ of lengths of curves having a radius $R_{c1}$, the curved portion $10a_2$ has a total $R_{c2}l$ of lengths of curves having a radius $R_{c2}$, and the straight portion $10c_3$ has a total $S_c l$ of lengths of the straight portion $10_{c3}$.

In the arm waveguide 10d, the curved portion $10d_1$ has a total $R_{d1}l$ of lengths of curves having a radius $R_{d1}$, the curved portion $10a_2$ has a total $R_{d2}l$ of lengths of curves having a radius $R_{d2}$, and the straight portion $10d_3$ has a total $S_d l$ of lengths of the straight portion $10_{d3}$.

Example 2 has a configuration in which the arm waveguides 10a to 10d each have the same ratios of: the total of the lengths of the straight portion of the arm waveguide to the overall length of the arm waveguide; and the total of the lengths of the curved portions of the arm waveguide with respect to the overall length of the arm waveguide. Thus, the straight portions and the curved portions of the arm waveguides 10a to 10d satisfy the following relation.

$$\frac{S_a l}{L_a} = \frac{S_b l}{L_b}$$

$$= \frac{S_c l}{L_c}$$

$$= \frac{S_d l}{L_d}$$

Formula 5

$$\frac{R_{a1}l + R_{a2}l}{L_a} = \frac{R_{b1}l + R_{b2}l}{L_b}$$

$$= \frac{R_{c1}l + R_{c2}l}{L_c}$$

$$= \frac{R_{d1}l + R_{d2}l}{L_d}$$

Note that $L_a$ to $L_d$ denote the overall lengths of the arm waveguides 10a to 10d, respectively.

In other words, in Example 2, the lengths of $R_{a1}l$ to $R_{d1}l$, $R_{a2}l$ to $R_{d2}l$, and $S_a l$ to $S_d l$ in the arm waveguides 10a to 10d are equal to each other. Thus, the straight portions and the curved portions of the arm waveguides 10a to 10d satisfy the following relation.

$R_{a1}l = R_{b1}l = R_{c1}l = R_{d1}l$ $R_{a2}l = R_{b2}l = R_{c2}l = R_{d2}l$ $S_a l = S_b l = S_c l = S_d l$

In addition, since an equivalent index of an arm waveguide depends on the radius of a curved portion of an arm waveguide, the curved portions of the arm waveguides 10a to 10d are formed to further satisfy the following relations.

$$R_{a1}=R_{b1}=R_{c1}=R_{d1}$$

$$R_{a2}=R_{b2}=R_{c2}=R_{d2}$$

The configuration according to Example 2 enables arm waveguides to have an optical path length equal to each other, even if the arm waveguides have curved portions.

INDUSTRIAL APPLICABILITY

The present invention can be utilized as an optical 90-degree hybrid circuit which is a component of an optical receiver used in a coherent receiving method in optical transmission systems.

The invention claimed is:

1. An optical 90-degree hybrid circuit comprising:
    first optical splitting means for receiving and splitting a first light beam into two;
    second optical splitting means for receiving and splitting a second light beam into two;
    first optical coupling means for generating an interfering light beam by multiplexing one of the light beams split by the first optical splitting means and one of the light beams split by the second optical splitting means;
    second optical coupling means for generating an interfering light beam by multiplexing the other one of the light beams split by the second optical splitting means and the other one of the light beams split by the first optical splitting means;
    a first arm waveguide connecting the first optical splitting means and the first optical coupling means;
    a second arm waveguide connecting the first optical splitting means and the second optical coupling means;
    a third arm waveguide connecting the second optical splitting means and the first optical coupling means; and
    a fourth arm waveguide connecting the second optical splitting means and the second optical coupling means, wherein:
        the first optical splitting means includes an optical coupler configured to receive the first light beam and to output two light beams having equal phases,
        the second optical splitting means includes an optical coupler configured to receive the second light beam and to output two light beams having a phase difference of 90 degrees,
        the first arm waveguide, the second arm waveguide, the third arm waveguide, and the fourth arm waveguide each have a straight portion, a first curved portion and a second curved portion,
        the straight portions of the first arm waveguide, the second arm waveguide, the third arm waveguide, and the fourth arm waveguide are equal in length,
        the first curved portions of the first arm waveguide, the second arm waveguide, the third arm waveguide, and the fourth arm waveguide are equal in radius and length, and
        the second curved portions of the first arm waveguide, the second arm waveguide, the third arm waveguide, and the fourth arm waveguide are equal in length and radius.

2. The optical 90-degree hybrid circuit according to claim 1, wherein the second optical splitting means includes a directional coupler.

3. The optical 90-degree hybrid circuit according to claim 1, wherein the second optical splitting means includes an MMI coupler.

4. An optical 90-degree hybrid circuit comprising:
    a first optical splitter that receives and splits a first light beam and outputs the split light beam as first and second split beams having equal phases;
    a second optical splitter that receives and splits a second light beam and outputs the split light beam as third and fourth split beams having a phase difference of 90 degrees;
    a first optical coupler that multiplexes the first split beam and the third split beam to generate a first interfering light beam;
    a second optical coupler that multiplexes the second split beam and the fourth split beam to generate a second interfering light beam;
    a first arm waveguide connecting the first optical splitter and the first optical coupler;
    a second arm waveguide connecting the first optical splitter and the second optical coupler;
    a third arm waveguide connecting the second optical splitter and the first optical coupler; and
    a fourth arm waveguide connecting the second optical splitter and the second optical coupler, each of the waveguides comprising a straight portion, a first curved portion, and a second curved portion, the straight portions of all of the waveguides being equal in length, the first curved portions of all of the waveguides being equal in radius and length, and the second curved portions of all of the waveguides being equal in length and radius.

5. The optical 90-degree hybrid circuit according to claim 4, wherein the second optical splitter comprises a directional coupler.

6. The optical 90-degree hybrid circuit according to claim 4, wherein the second optical splitter comprises an MMI coupler.

* * * * *